United States Patent
Cardimen

(10) Patent No.: US 10,464,549 B2
(45) Date of Patent: Nov. 5, 2019

(54) ELECTRIC DRIVE DIRECTION CONFIRMATION SYSTEM AND METHOD

(71) Applicant: Honda Motor Co., Ltd., Tokyo (JP)

(72) Inventor: Peter J. Cardimen, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/824,090

(22) Filed: Nov. 28, 2017

(65) Prior Publication Data

US 2019/0161073 A1    May 30, 2019

(51) Int. Cl.
*B60W 20/30* (2016.01)
*B60K 6/547* (2007.10)
*B60W 10/11* (2012.01)
*B60W 10/08* (2006.01)
*F16H 59/12* (2006.01)
*F16H 63/50* (2006.01)

(52) U.S. Cl.
CPC ............ *B60W 20/30* (2013.01); *B60K 6/547* (2013.01); *B60W 10/08* (2013.01); *B60W 10/11* (2013.01); *F16H 59/12* (2013.01); *F16H 63/50* (2013.01); *B60W 2510/1005* (2013.01); *B60W 2520/06* (2013.01); *B60W 2710/08* (2013.01); *B60Y 2200/92* (2013.01); *B60Y 2300/60* (2013.01); *B60Y 2300/70* (2013.01); *Y10S 903/919* (2013.01); *Y10S 903/93* (2013.01)

(58) Field of Classification Search
CPC ...... B60W 20/30; B60W 10/08; B60W 10/11; B60K 6/547; Y10S 903/919; B60Y 2200/92

USPC .......................................................... 701/22
See application file for complete search history.

(56) References Cited

U.S. PATENT DOCUMENTS

| | | | |
|---|---|---|---|
| 5,446,351 A | 8/1995 | Kusano et al. | |
| 6,590,299 B2 | 7/2003 | Kuang et al. | |
| 8,814,750 B2 | 8/2014 | Kaltenbach et al. | |
| 9,308,831 B2 | 4/2016 | Monsere | |
| 2009/0222181 A1* | 9/2009 | Lindgren | F16H 59/0204 701/64 |
| 2010/0179737 A1* | 7/2010 | Eriksson | F16H 61/0213 701/51 |
| 2012/0123652 A1* | 5/2012 | Rockwood | B60W 10/06 701/54 |
| 2012/0209465 A1* | 8/2012 | Dehmann | B60R 16/0236 701/22 |
| 2014/0121918 A1* | 5/2014 | Davis | B60W 10/103 701/55 |
| 2016/0264020 A1 | 9/2016 | Ochocinski et al. | |
| 2016/0363214 A1* | 12/2016 | Baek | F16H 59/12 |
| 2017/0072943 A1 | 3/2017 | Pedlar et al. | |

* cited by examiner

*Primary Examiner* — Tan Q Nguyen
(74) *Attorney, Agent, or Firm* — Rankin, Hill & Clark LLP

(57) ABSTRACT

An electric drive direction confirmation system and method for a vehicle are provided. The system and method include receiving a gear selector input signal corresponding to a gear selection from an electronic gear selector on the vehicle, determining whether the gear selector input signal corresponds to a directional movement gear selection, and, when determined that the gear selector input signal corresponds to the directional movement gear selection, sending a drive command to temporarily urge the vehicle in a direction corresponding to the gear selection.

20 Claims, 4 Drawing Sheets

US 10,464,549 B2

ELECTRIC DRIVE DIRECTION CONFIRMATION SYSTEM AND METHOD

BACKGROUND

Electric vehicles, including hybrid electric vehicles, generally include at least one electric motor powered by a rechargeable battery. Typically, the electric motor can provide motive power for the vehicle. In a hybrid electric vehicle, such motive power provided by the electric motor can be supplemental to or in substitution for motive power provided by another motive source, such as an internal combustion engine.

Whether a hybrid or not, electric vehicles can also include a push button or gear selector for putting the vehicle into the following gears or states: park, reverse, neutral and drive (and optional several drive states can be provided, such as D1, D2 and D3, for example). In one known example, push buttons are provided corresponding to each gear or states. For example, a first push button corresponds to park, a second push button corresponds to reverse, etc. When a particular push button is depressed, a signal is provided to the electronic control unit (ECU) or some other controller and then acted upon.

In contrast, conventional vehicles, such as many slightly older internal combustion engine vehicles, typically include a mechanical automatic gear shifter (sometimes referred to as a PRNDL shifter) that is movable (e.g., slidable) through various positions corresponding to park, reverse, neutral and one or more drive states. Typically, such automatic gear shifters are required to move sequentially through the gear states. For example, to move the gear shifter from park to drive, the gear shifter is typically moved through and past reverse and neutral. Due to the mechanical connection between the gear shifter and the vehicle's automatic transmission, tactile feedback is provided to the driver as the shifter was moved.

BRIEF DESCRIPTION

According to one aspect, an electric drive direction confirmation system for a vehicle is provided. The system includes a memory storing instructions that, when executed by a processor, cause the processor to: receive a gear selector input signal corresponding to a gear selection from an electronic gear selector on the vehicle, determine whether the gear selector input signal corresponds to a directional movement gear selection, and, when determined that the gear selector input signal corresponds to the directional movement gear selection, send a drive command to temporarily urge the vehicle in a direction corresponding to the gear selection.

According to another aspect, a computer-implemented electric drive direction confirmation method for a vehicle is provided. The method includes receiving a gear selector input signal corresponding to a gear selection from an electronic gear selector on the vehicle, determining whether the gear selector input signal corresponds to a directional movement gear selection, and, when determined that the gear selector input signal corresponds to the directional movement gear selection, sending a drive command to temporarily urge the vehicle in a direction corresponding to the gear selection.

According to a further aspect, a non-transitory computer readable storage medium storing instructions that, when executed by a computer, which includes at least a processor, causes the computer to perform a method that includes receiving a gear selector input signal corresponding to a gear selection from an electronic gear selector on the vehicle, determining whether the gear selector input signal corresponds to a directional movement gear selection, and, when determined that the gear selector input signal corresponds to the directional movement gear selection, sending a drive command to temporarily urge the vehicle in a direction corresponding to the gear selection.

DETAILED DESCRIPTION

Figure 1:
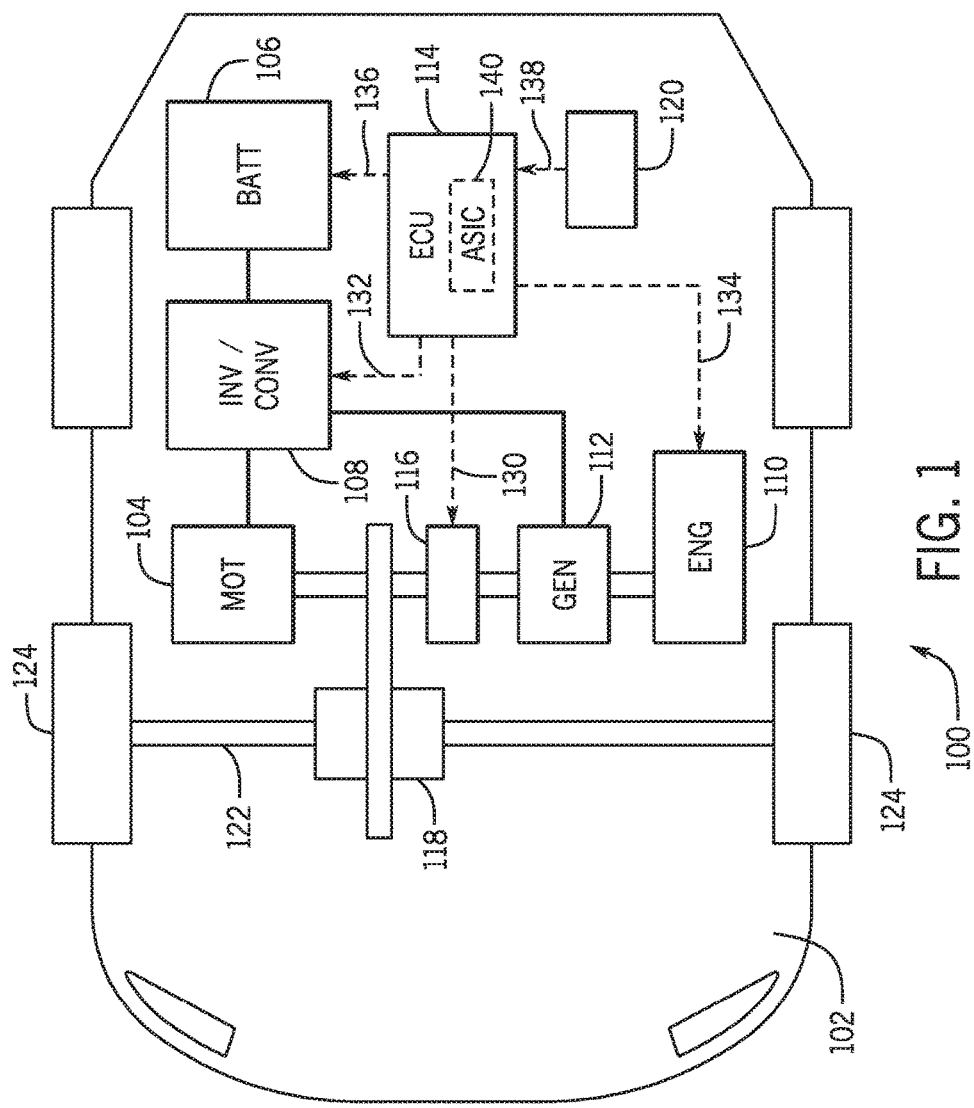
FIG. 1 illustrates a schematic view of an operating environment of an electric drive direction confirmation system for a vehicle according to an exemplary embodiment.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "computer-readable medium", as used herein, refers to a medium that provides signals, instructions and/or data. A computer-readable medium can take forms, including, but not limited to, non-volatile media and volatile media. Non-volatile media can include, for example, optical or magnetic disks, and so on. Volatile media can include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device can read.

A "data store", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device. The data store can also refer to a database, for example, a table, a set of tables, a set of data stores (e.g., a disk, a memory, a table, a file, a list, a queue, a heap, a register) and methods for accessing and/or manipulating those data in those tables and data stores. The data store can reside in one logical and/or physical entity and/or can be distributed between two or more logical and/or physical entities.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, key fobs, handheld devices, mobile devices, smart phones, laptops, tablets and e-readers.

An "electric vehicle" (EV), as used herein, refers to any moving vehicle that is capable of carrying one or more human occupants and is powered entirely or partially by one or more electric motors. The one or more electric motors can be powered by one or more electric batteries or some other electric current generator (e.g., fuel cells). The EV can include hybrid electric vehicles (HEVs), battery electric vehicles (BEVs), plug-in hybrid electric vehicles (PHEVs), fuel cell vehicles (FCVs) and extended range electric vehicles (EREVs). The term "vehicle" includes, but is not limited to: cars, trucks, vans, minivans, SUVs, motorcycles, scooters, boats, personal watercraft, and aircraft.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X can be given as a percentage between 0% and 100%. In other cases, the value or level of X could be a value in the range between 1 and 10. In still other cases, the value or level of X cannot be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 shows a schematic view of an exemplary operating environment of an electric drive direction confirmation system 100 for a vehicle 102. As will be described in more detail below, the system 100 provides feedback to a driver of the vehicle 102 when a gear selection is made so the driver receives confirmation regarding the gear selection. The components of the system 100, as well as the components of other systems, hardware architectures and software architectures discussed herein, can be combined, omitted or organized into different architecture for various embodiments. However, the exemplary embodiment(s) discussed herein focus on the environment as illustrated in FIG. 1, with corresponding system components, and related methods.

In an exemplary embodiment, the system 100 includes the vehicle 102, which is an electric vehicle (EV) powered by, at least in part, an electric motor (MOT) 104. The system 100 can additionally include a battery (BATT) 106, inverter/converter (INV/CONV) 108, an internal combustion engine (ENG) 110, a generator (GEN) 112, an electronic control unit (ECU) 114, a clutch 116, a gearbox 118, and an electronic gear selector 120. The battery 106 can be a plurality of battery cells which are connected in series to supply a high voltage of 100 to 200 v., for example. The battery cells can be, for example, a lithium ion battery or a nickel-metal hydride battery.

The inverter/converter 108 can include one or more inverters and one or more converters electrically connected between the battery 106 and each of the motor 104 and the generator 112. In one example, the inverter/converter 108 can include a converter (not shown) that increases or decreases a direct current output voltage of the battery 106 without altering the nature of the direct current and a first inverter (not shown) between this converter and the electric motor 104 for converting the direct current voltage to an alternating current voltage to supply a three-phase current to the electric motor 104. Additionally, this first inverter can convert the alternating current voltage which is inputted there into when the electric motor 104 performs a regenerative operation to a direct current to charge the battery 106.

The electric motor 104 can generate power for driving the vehicle 102. In particular, torque generated in the electric motor 104 can be transmitted to a drive shaft 122 via the gear box 118. A rotor (not shown) of the electric motor 104 can be directly coupled to the gear box 118. In addition, the electric motor 104 can operate as a generator when regenerative breaking is executed, and electric power generated in the electric motor 104 can charge the battery 106.

When the clutch 116 is disengaged, the internal combustion engine 110 can be used only for the generator 112. When the clutch 116 is engaged, however, the output of the internal combustion engine 110 can be transmitted to the drive shaft 122 via the generator 112, the clutch 116, and the gear box 118 as mechanical energy for driving the vehicle 102. The internal combustion engine 110 can be coupled directly to a rotor (not shown) of the generator 112.

The generator 112 can generate electric power by using power of the internal combustion engine 110. Electric power generated by the generator 112 can be stored in the battery 106 or supplied to the motor 104. The inverter/converter can include a second invertor (not shown) that converts an alternating current voltage generated in the generator 112 to a direct current voltage. Electric power converted by this second converter can be stored in the battery 106 or can be supplied to the electric motor 104.

The clutch 116 engages or disengages a transmission path of driving force from the internal combustion engine 110 to drive wheels 124 based on an instruction signal from the ECU 114 illustrated schematically as 130. The gear box 118 can convert a driving force from the internal combustion engine 110 via the generator 112 of a driving force from the electric motor 104 to a rotational speed and torque at a specific gear ratio and transmits it to the drive shaft 122. While the ECU 114 is schematically shown in FIG. 1 as sending signals (e.g., the instruction signal 130 and signals 132-138) to the clutch 116, the electric motor 104, the internal combustion engine 110, and the battery 106, it is to be understood that more than a single ECU can be provided for these various functions. For example, a separate battery ECU could be provided, a separate electric motor ECU could be provided, and/or a separate internal combustion engine ECU could be provided.

In an exemplary embodiment, the ECU 114 operatively controls the vehicle 102 and its components that can include, but are not limited to the components shown in FIG. 1. The ECU 114 can include a microprocessor, one or more application-specific integrated circuits (ASICs), or other similar devices. The ECU 114 can also include (though none are shown) internal processing memory, an interface circuit, and bus lines for transferring data, sending commands, and communicating with the systems and components of the vehicle 102. Generally, the ECU 112 includes a processor and memory (not shown). The ECU 114 also includes a separate communications device (not shown) for sending data internally in the vehicle 102.

The system 100 can further include an electric drive direction confirmation ASIC 140 included as part of the electronic control unit 114 of the vehicle 102. As will be described in more detail below, the ASIC 140 can issue one or more execution commands to temporarily urge the vehicle 102 in a direction corresponding to a gear selection. In particular, and as will be described in more detail below, the ASIC 140 can receive a gear selector input signal 138 corresponding to a gear selection from the electronic gear selector 120 on the vehicle 102. The ASIC 140 can then determine whether the gear selector input signal 138 corresponds to a directional movement gear selection (i.e., does the gear selection correspond to a forward or rearward movement direction for the vehicle 102?), and, when determined that the gear selector input signal 138 corresponds to the directional movement gear selection, the ASIC 140 can send a drive command to the electric motor 104 to temporarily urge the vehicle 102 in a direction corresponding to the gear selection.

In one or more embodiments, the ASIC 140 can be included in the form of an integrated circuit that is embedded as part of the ECU 114. In some embodiments, the ASIC 140 can include its own microprocessor and memory (not shown) and, alternatively, the ASIC 140 can be completely independent of the ECU 114. In one embodiment, the ECU 114 can operatively communicate with a head unit (now shown) of the vehicle 102. Additionally, the ECU 114 and/or the head unit can send one or more command signals to a plurality of vehicle systems (e.g., entertainment, lighting system, etc.) that can communicate with the ASIC 140 to provide one or more notifications to individuals associated with the vehicle 102 (e.g., the driver, passengers, etc.).

Figure 2:
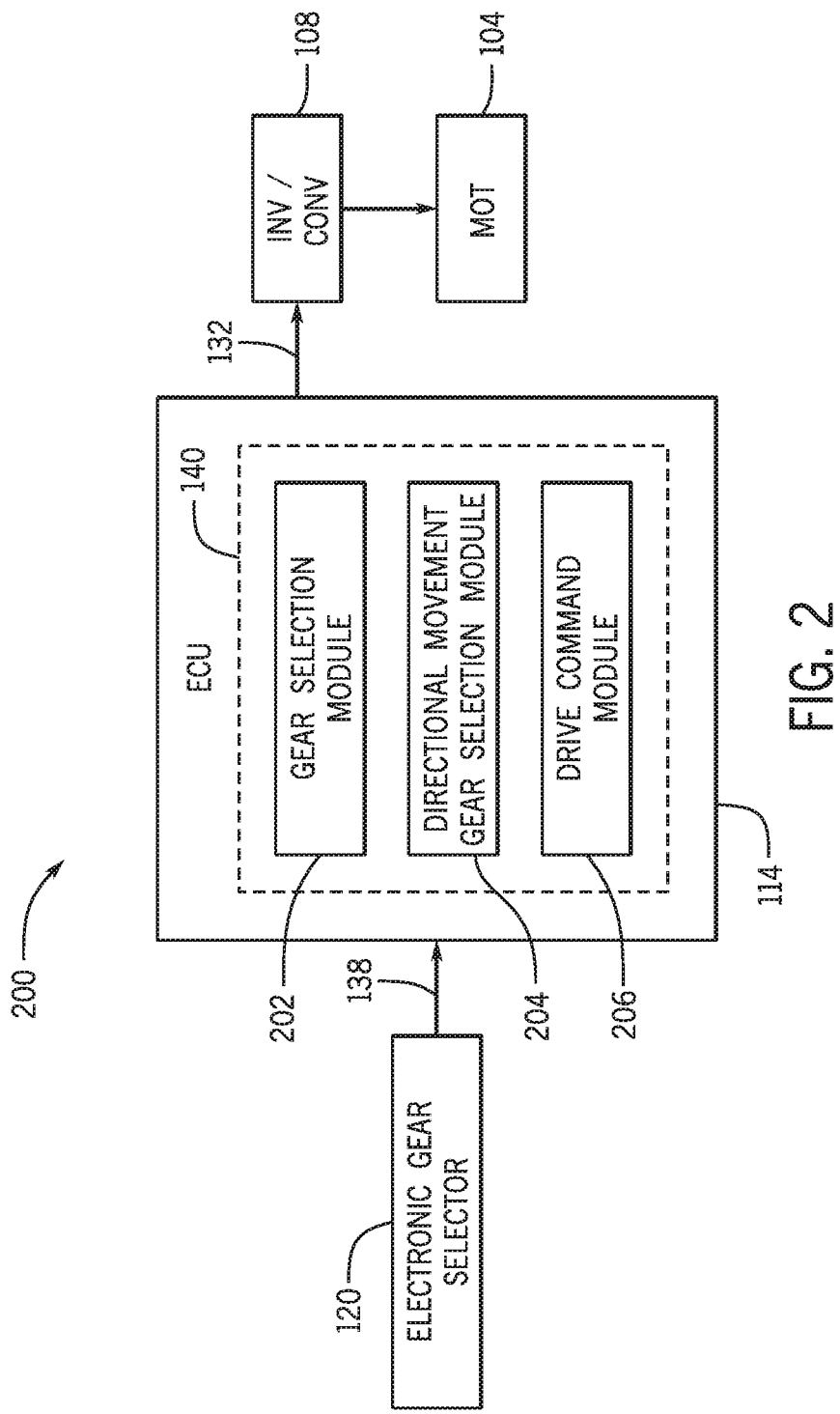
FIG. 2 illustrates a schematic view of an exemplary operating environment of an electric drive direction confirmation application-specific integrated circuit (ASIC) according to an exemplary embodiment.

With additional reference to FIG. 2, the ASIC 140 will now be discussed in more detail. FIG. 2 illustrates a schematic view of an exemplary operating environment 200 of the ASIC 140 according to an exemplary embodiment. As shown in FIG. 2, in an illustrative embodiment, the ASIC 140 can execute and store one or more modules 202, 204, and 206 that can include a gear selection module 202, a directional movement gear selection module 204, and a drive command module 206.

Figure 3:
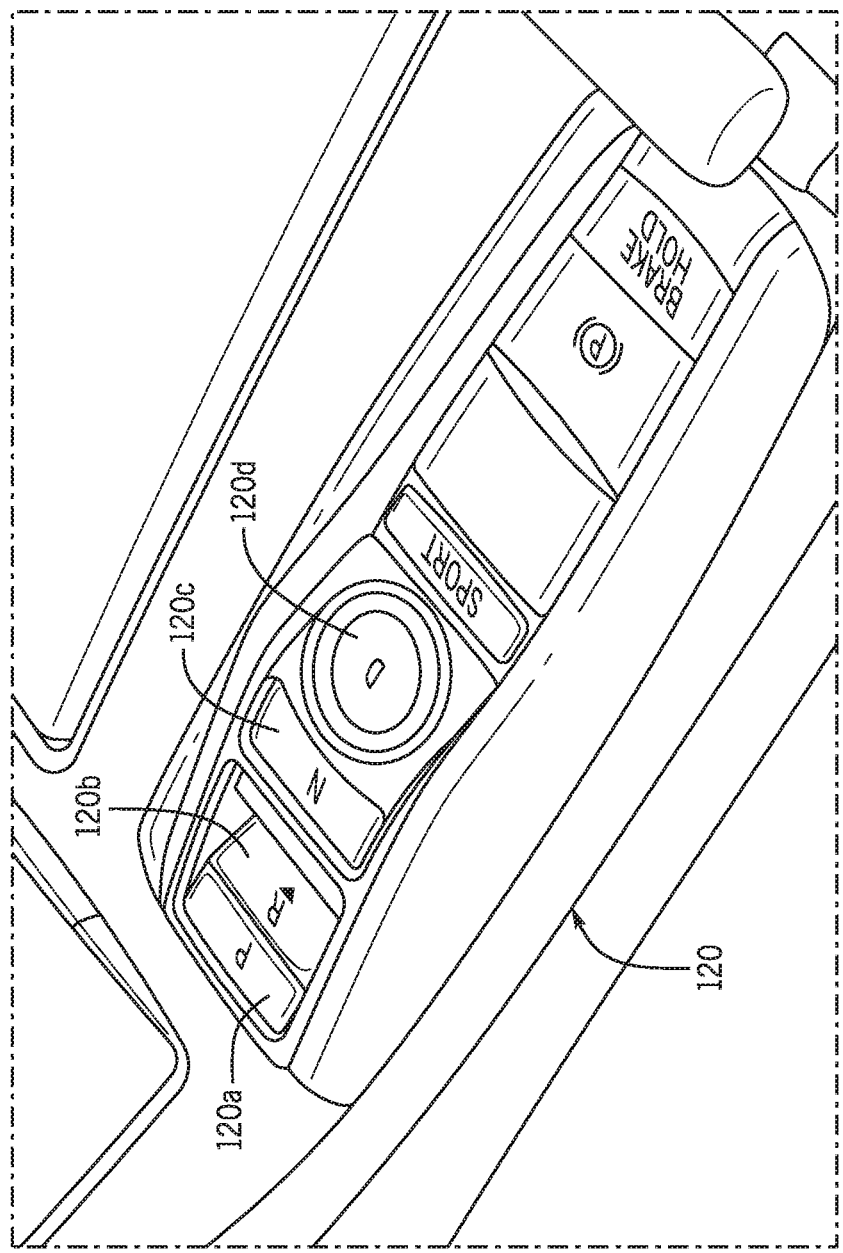
FIG. 3 illustrates a partial perspective view of an electronic gear selector according to an exemplary embodiment.

In operation, the gear selection module 202 receives the gear selector input signal 138 corresponding to a gear selection from the electronic gear selector 120 on a vehicle 102. With further reference to FIG. 3, the electronic gear selector 120 is shown according to one exemplary embodiment. In particular, as shown in FIG. 3, the gear selector 120 includes a plurality of actuators 120a-120d with each of the plurality of actuators 120a-120d corresponding, respectively, to a park gear (actuator 120a), a reverse gear (actuator 120b), a neutral gear (actuator 120c), and a drive gear (actuator 120d). As is known, each of the actuators 120a-120d can be actuated (e.g., depressing the actuator or manually initiating some other actuation action) to make a gear selection.

Thus, the gear selection on the gear selector 120 of FIG. 3 can be one of the park gear, the reverse gear, the neutral gear, and the drive gear. In the illustrated embodiment, the park gear actuator 120a is a park gear push button actuator actuated by depressing the actuator 120a. Likewise, the actuator 120c and be a push button actual for actuating the neutral gear and the actuator 120d can be a push button actuator for actuating the drive gear. In contrast, in one embodiment, the actuator 120b can require a pulling motion on the actuator 120b for actuation thereof to actuator the reverse gear. Within the vehicle 102, audio and/or visual indicators (not shown) can be associated with each of the actuators 120a-120d. For example, an indicator or indicator message can be provided on the dashboard of the vehicle 102 (not shown) and/or can be provided on or adjacent the actuator 120a-120d that is selected. Receiving the gear selector input signal 138 can include translating push button actuation (e.g., via actuators 120b or 120d) of the electronic gear selector 120 into the gear selector input signal 138 corresponding to the gear selection as selected via the push button actuation. Alternatively, the gear selector 120 can be otherwise configured. For example, any input device can be provided for receiving a specified actuation to indicate a desired gear selection (or a desired direction of travel) for the vehicle 102. Such alternative input devices can include, and are not limited to, knobs, dials, touch pads, touch screens, etc.

Returning specific reference to FIG. 2, the directional movement gear selection module 204 can determine whether the gear selector input signal 138 (i.e., the signal received from the gear selector 120 when one of the actuators 120a-120d is selected) corresponds to a directional movement gear selection. In one embodiment, the module 204 determines that the gear selector input signal 138 corresponds to a directional movement gear selection when the gear selection is one of the reverse gear or the drive gear. In a specific embodiment, the module 204 can determine that the gear selector input signal 138 corresponds to the directional movement gear selection only when the gear selection is either the reverse gear or the drive gear. Accordingly, the module 204 determines that the gear selector input signal corresponds to the directional movement gear selection only when the actuator 120a or the actuator 120d is actuated (i.e., depressed). The gear selector input signal 138 is determined to not correspond to the direction movement gear selection by module 204 when the gear selection is any one of the park gear or the neutral gear.

When the module 204 determines that the gear selection input signal 138 corresponds to the directional movement gear selection, the drive command module 206 can send drive command or drive command signal 132 to the inverter/converter of 108 for providing motive power from the electric motor 104 to the drive wheels 124 via the drive shafts 122 and the gear box 118. The drive command signal 132 can temporarily urge, or result in the temporary urging of, the vehicle 102 in a forward direction when the gear selection is the drive gear and can temporarily urge the vehicle 102, or result in the temporary urging of, the vehicle 102 in the rearward direction when the gear selection is the reverse gear. This urging, whether in the forward or rearward direction, is sufficient so that the driver of the vehicle 102 notices or feels the urging.

More specifically, the drive command module 206 can issue the drive command 132 to instruct the electric motor 104 of the vehicle 102 to nudge or slightly move the vehicle 102 forwardly when the gear selection is in the forward direction and can instruct the electric motor 104 to nudge or slightly move the vehicle 102 rearwardly when the gear selection is in the rearward direction. As used herein, to nudge (or to slightly move) the vehicle 102 means to pulse the electric motor 104 and thus the vehicle 102 in the desired direction of travel for the vehicle 102. This pulsing can provide feedback to the driver to confirm the gear selection made by the driver. For example, when the driver selects the drive gear, the nudge or pulse of the vehicle 102 in the forward direction provides feedback to the driver (i.e., a type of notification or confirmation to the driver) that the drive gear was selected. Likewise, when the driver selects the reverse gear, the nudge or pulse of the vehicle 102 in the rearward direction provides feedback (i.e., again, a type of notification or confirmation to the driver) to the driver that the reverse gear was selected.

Exemplary Method Utilized by the ASIC

Figure 4:
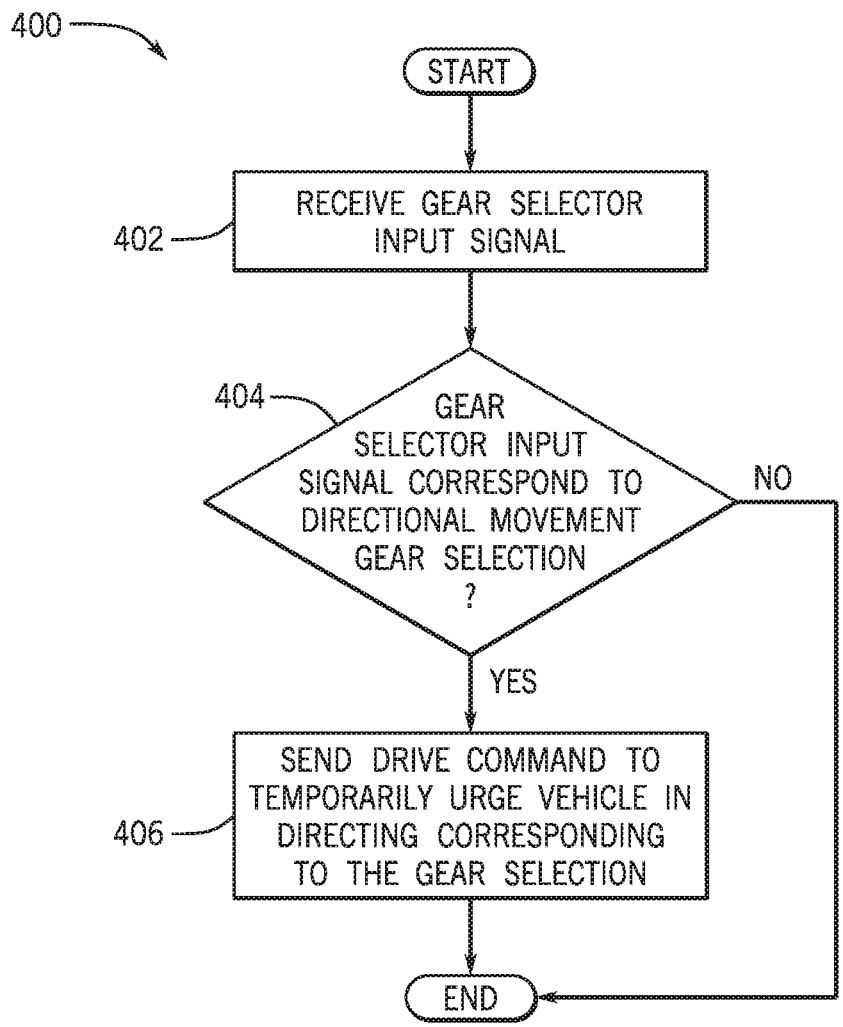
FIG. 4 is a process flow diagram of an electric drive direction confirmation method for a vehicle according to an exemplary embodiment.

FIG. 4 is a process flow diagram of a computer-implemented electric drive direction confirmation method 400 for a vehicle according to an exemplary embodiment. The method 400 of FIG. 4 will be described with reference to the components of FIGS. 1-3, though it is to be appreciated that the method of FIG. 4 can be used with other systems and/or components. The method 400 of FIG. 4 includes, at 402, the ECU 114, and particularly the electric drive direction confirmation ASIC 140, receiving the gear selector input signal 138 corresponding to a gear selection from the electronic gear selector 120 on the vehicle 102.

Next, at 404, the module 204 determines whether the gear selector input signal 138 corresponds to a directional movement gear selection. As described above, the gear selection can be one of the park gear, the reverse gear, the neutral gear, and one or more drive gears. The gear selector input signal 138 can be determined to correspond to the directional movement gear selection via the module 204 at 404 when the gear selector input signal 138 corresponds to the gear selection that is either the reverse gear or the drive gear.

Next, at 406, when determined in 404 that the gear selector input signal 138 corresponds to the directional movement gear selection, the drive command module 206 can send the drive command 132 to temporarily urge the vehicle 102 in a direction corresponding to the gear selection. For example, when the gear selection is the drive gear, the drive command module 206 can send the drive command 132 to temporarily urge or nudge the vehicle 102 in the forward direction that corresponds to the drive gear. Likewise, when the reverse gear is selected, the drive command module 206 can send the drive command 132 to temporarily urge or nudge the vehicle 102 in the rearward direction corresponding to the reverse gear. In particular, the drive command 132 can temporarily urge the vehicle 102 via the electric motor 104 in the direction corresponding to the gear selection and this can include instructing the electric motor 104 via the inverter/converter 108 to slightly move or pulse in the direction corresponding to the gear selection. Advantageously, this slight initial motion in the correct intended direction for the vehicle 102 can be used to give the drive physical confirmation of the gear selection.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An electric drive direction confirmation system for a vehicle, comprising:
   a memory storing instructions that, when executed by a processor cause the processor to:
   receive a gear selector input signal corresponding to a gear selection from an electronic gear selector on the vehicle;
   determine whether the gear selector input signal corresponds to a directional movement gear selection; and
   when determined that the gear selector input signal corresponds to the directional movement gear selection, send a drive command to temporarily urge the vehicle in a direction corresponding to the gear selection.

2. The system of claim 1 wherein the gear selection is one of a park gear, a reverse gear, a neutral gear and a drive gear.

3. The system of claim 2 wherein the gear selector includes a plurality of actuators with each of said plurality of actuators corresponding, respectively to the park gear, the reverse gear and neutral gear and the drive gear.

4. The system of claim 3 wherein the plurality of actuators include a push button drive gear actuator and a push button reverse gear actuator.

5. The system of claim 2 wherein the gear selector input signal corresponds to the directional movement gear selection only when the gear selection is the reverse gear or the drive gear.

6. The system of claim 1 wherein the gear selector input signal corresponds to the directional movement gear selection when the gear selection is one of a reverse gear or a drive gear.

7. The system of claim 6 wherein the drive command temporarily urges the vehicle in a forward direction when the gear selection is the drive gear and temporarily urges the vehicle in a rearward direction when the gear selection is the reverse gear.

8. The system of claim 1 wherein the electronic gear selector includes an actuator for selecting the gear selection from the following: at least one park gear, at least one reverse gear, at least one neutral gear and at least one drive gear, and wherein the gear selector input signal is determined to correspond to the directional movement gear selection when said at least one reverse gear or said at least one drive gear is selected on the electronic gear selector.

9. The system of claim 8 wherein the drive command instructs an electric motor of the vehicle to nudge the vehicle forwardly when the gear selection is said at least one drive gear and instructs the electric motor to nudge the vehicle rearwardly when the gear selection is said at least one reverse gear.

10. A computer-implemented electric drive direction confirmation method for a vehicle, comprising:
   receiving a gear selector input signal corresponding to a gear selection from an electronic gear selector on the vehicle;
   determining whether the gear selector input signal corresponds to a directional movement gear selection; and
   when determined that the gear selector input signal corresponds to the directional movement gear selection, sending a drive command to temporarily urge the vehicle in a direction corresponding to the gear selection.

11. The method of claim 10 wherein the gear selection is one of a park gear, a reverse gear, a neutral gear and a drive gear.

12. The method of claim 11 wherein the gear selector input signal is determined to correspond to the directional movement gear selection when the gear selector input signal corresponds to the gear selection that is either the reverse gear or the drive gear.

13. The method of claim 10 wherein sending the drive command to temporarily urge the vehicle in the direction corresponding to the gear selection includes instructing an electric motor of the vehicle to slightly move or pulse in the direction corresponding to the gear selection.

14. The method of claim 13 wherein the drive command slightly moves or pulses the vehicle forward when the gear selection is a drive gear and slightly moves or pulses the vehicle rearward when the gear selection is a reverse gear.

15. The method of claim 14 wherein the gear selector input signal is determined to not correspond to the directional movement gear selection when the gear selection is any one of a park gear or a neutral gear.

16. The method of claim 10 wherein receiving the gear selector input signal includes translating push button actuation of the electronic gear selector into the gear selector input signal corresponding to the gear selection as selected via said push button actuation.

17. A non-transitory computer readable storage medium storing instructions that, when executed by a computer, which includes at least a processor, causes the computer to perform a method, the method comprising:
   receiving a gear selector input signal corresponding to a gear selection from an electronic gear selector on a vehicle;
   determining whether the gear selector input signal corresponds to a directional movement gear selection; and
   when determined that the gear selector input signal corresponds to the directional movement gear selection, sending a drive command to temporarily urge the vehicle in a direction corresponding to the gear selection.

18. The non-transitory computer readable storage medium of claim 17, wherein receiving the gear selector input signal includes translating push button actuation from the electronic gear selector into the gear selector input signal that corresponds with the gear selection.

19. The non-transitory computer readable storage medium of claim 17, wherein the gear selector input signal is determined to correspond to the directional movement gear selection when the gear selection is one of a reverse gear or a drive gear.

20. The non-transitory computer readable storage medium of claim 19, wherein said direction is forward when the gear selection is the drive gear and said direction is rearward when the gear selection is the reverse gear.

* * * * *